June 16, 1931.  W. A. MILAM  1,810,779
GUN CASTING ROD
Filed June 20, 1929
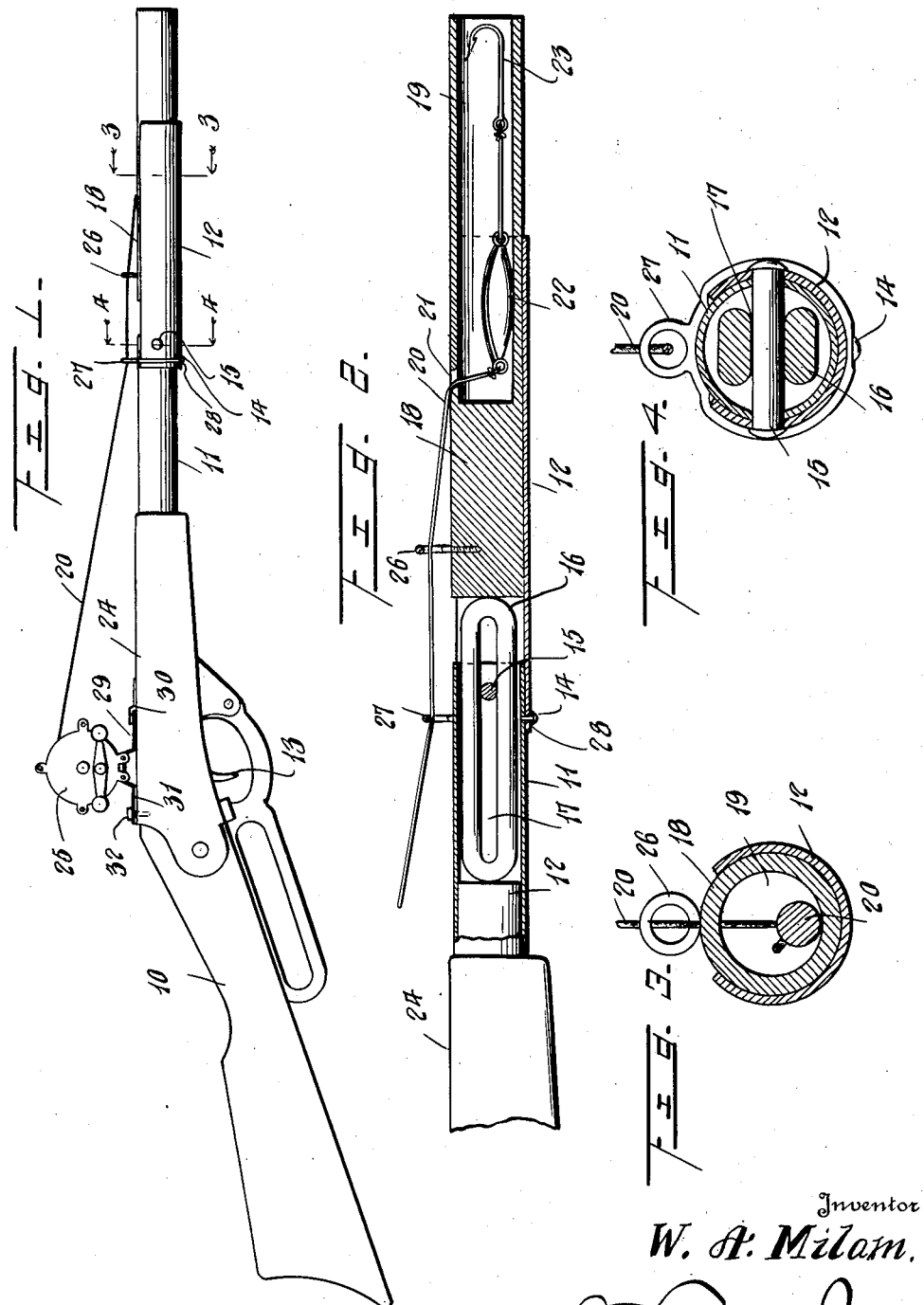
Inventor
W. A. Milam.
By
Attorney

Patented June 16, 1931

1,810,779

UNITED STATES PATENT OFFICE

WILLIAM A. MILAM, OF AUSTIN, TEXAS

GUN CASTING ROD

Application filed June 20, 1929. Serial No. 372,398.

This invention relates to a casting rod employing a gun in order to effect the casting, thereby rendering it easy for an amateur or child to cast with maximum accuracy.

It is aimed to provide a construction which will particularly protect the bait so that it will not be lost during the act of casting.

Another object is to provide a novel construction wherein a floating body containing the hook, sinker and bait is adapted to be projected by the gun, such body forming a float, so that it will separate from the remaining parts when it reaches the water.

The more specific objects and advantages will become apparent from a consideration of the description following taken in connection with accompanying drawings illustrating an operative embodiment.

In said drawings:—

Figure 1 is a view of the gun in side elevation,

Figure 2 is a central longitudinal sectional view taken vertically through the projecting mechanism and parts to be projected, Figure 3 is a cross sectional view taken on the line 3—3 of Figure 1, and Figure 4 is a cross sectional view taken on the line 4—4 of Figure 1.

Referring specifically to the drawings, a gun of conventional form, such as a rifle 10 is used. This rifle may be of the type operated by air, a spring or otherwise, the same having a barrel 11 in which a plunger 12 is adapted for operation through the manipulation of a trigger 13 and intermediate parts not shown and constituting no part of the invention.

Suitably fastened to the barrel 11 is an extension 12 constituting a bracket or holder which is arcuate in cross section, being riveted or otherwise fastened as at 14 to the barrel 11. Transversely disposed across the barrel 11 at its forward end and also serving to fasten the holder 12 to the barrel, is a stud 15. Slidably mounted within the barrel 11 is an ejector 16 having an elongated slot 17 through which the said stud 15 passes.

The holder 12 releasably holds or positions a projectile body 18 which may be of light wood, cork or any material which will float, such body at its forward end being hollow to provide a space 19 into which a fishing line 20 may pass through an aperture 21 in the body. The fishing line carries as usual a conventional sinker 22 and hook 23, which are adapted to be arranged within the space 19. Since the hook is in such space 19, the bait will also be in that space and by the body 18 protected from discard from the hook incidental to casting.

Detachably mounted upon a housing 24 forming part of the body of the gun, is a reel 25 of conventional form upon which the line 20 is adapted to be wound, the reel automatically permitting the line to be paid out as the gun is operated. Such line 20 is guided by an eyelet 26 provided on the body 18 and an eyelet 27 carried by a ring 28 which is fastened to the barrel as by the rivets 14.

As a result of the construction described, with the parts in the positions shown in Figures 1 and 2 and a bait applied to the hook 23, the trigger 13 is operated which forces the plunger 12 forwardly correspondingly moving the ejector 16 and holder 18, releasing the latter from the gun, whereby it travels to its destination, automatically drawing the cord or line 20 from the reel 25. When the body 18 strikes the water, the weight 22 and hook 23 and bait, will leave the holder and enter the water. The element 18 thus protects the bait and associated parts incidental to their flight through the air in casting.

The reel 25 may be mounted in any desired manner upon the body 24 but is preferably detachable to which end it has a foot 29 detachably disposable under a portion of a cleat 30 and also has a foot 31 through which a screw 32 passes and detachably engages the body 24.

Various changes may be resorted to provided they fall within the spirit and scope of the invention.

I claim as my invention:—

1. A device of the class described comprising a barrel, an ejector movable therein, means to operate the ejector, a holder extending from the barrel and having a portion overlapping the same, a floating body adapted for disposition in the holder and engagement by the ejector, said body having a hollow portion and a port leading thereto for coaction with a line as described, a ring secured to and surrounding the holder and barrel at said portion, said ring having an eyelet through which the line is adapted to extend.

2. A device of the class described comprising a barrel, an ejector movable therein, means to operate the ejector, a holder extending from the barrel and having a portion overlapping the same, a floating body adapted for disposition in the holder and engagement by the ejector, said body having a hollow portion and a port leading thereto for coaction with a line, a ring secured to and surrounding the holder and barrel at said portion, said ring having an eyelet through which the line is adapted to extend, a guide member on the body through which the line extends, said ejector having an elongated slot, and a stud at the junction of the barrel and holder passing through said slot.

In testimony whereof I affix my signature.

WILLIAM A. MILAM.